March 23, 1971 F. N. SCHROEN 3,572,293
ANIMAL FEEDER
Filed Feb. 19, 1969 2 Sheets-Sheet 1
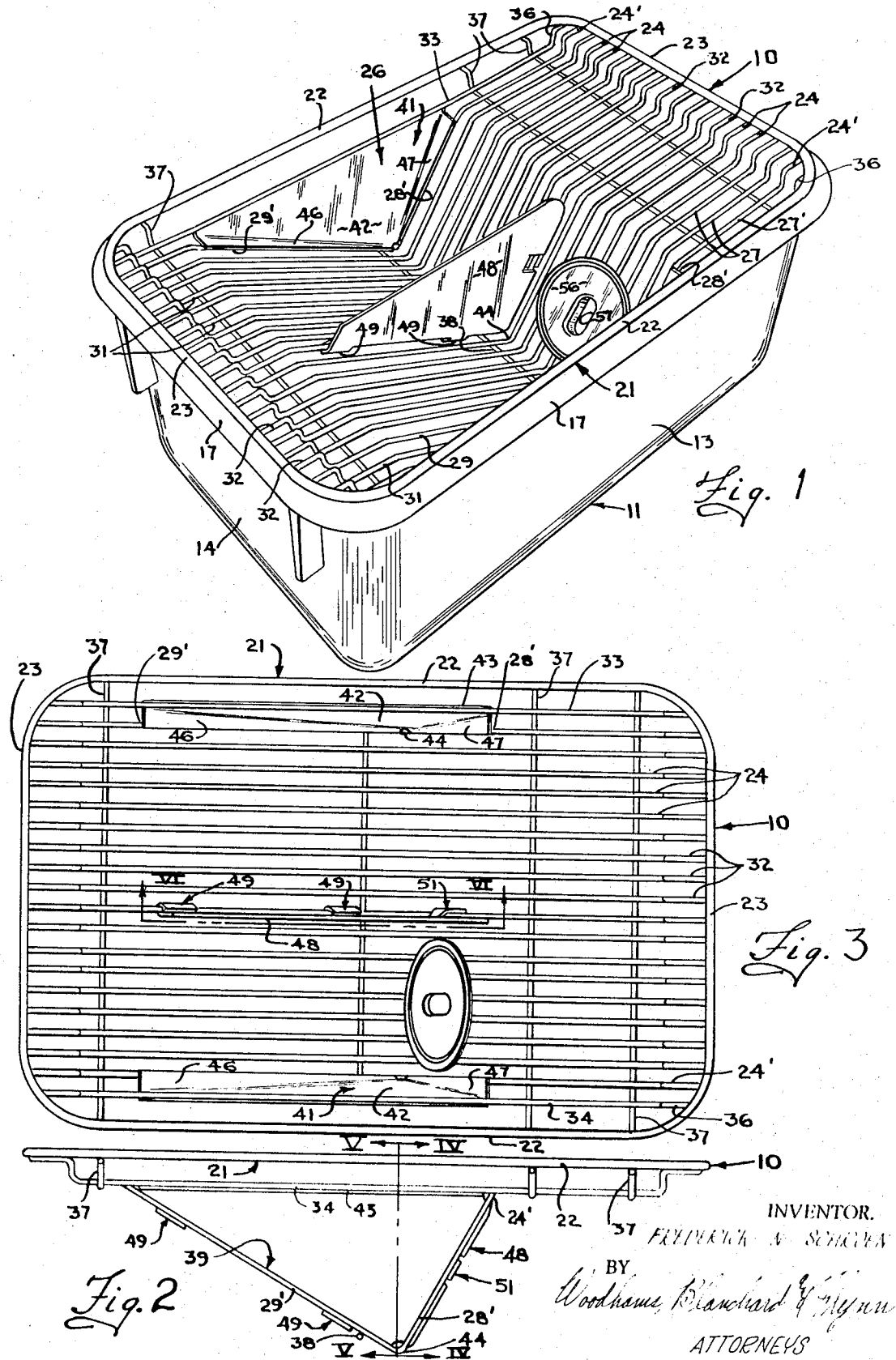

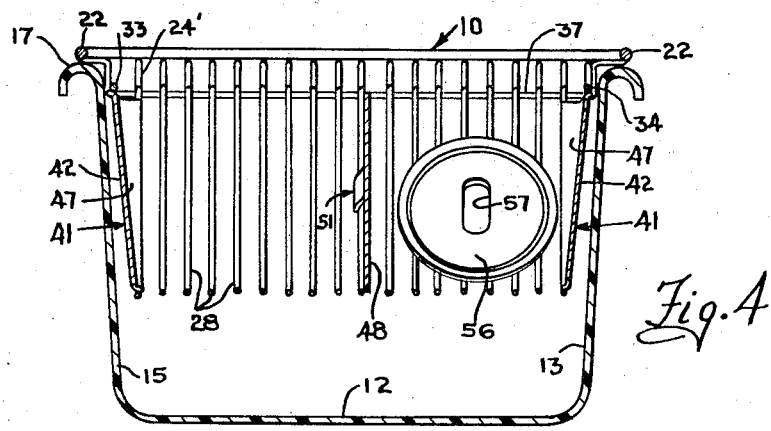
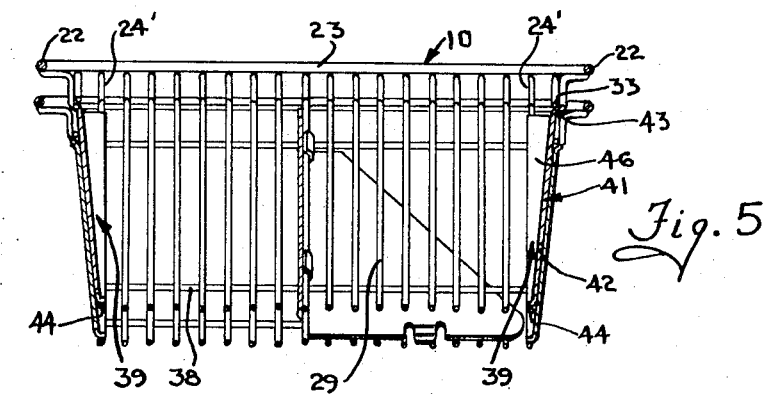
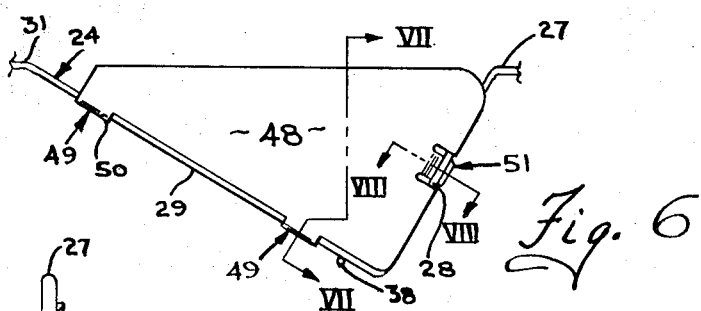
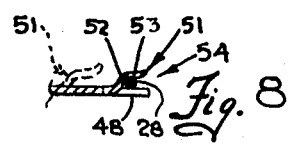
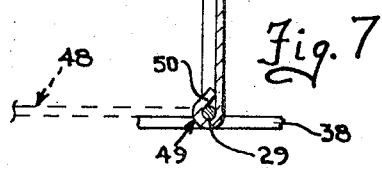

United States Patent Office 3,572,293
Patented Mar. 23, 1971

3,572,293
ANIMAL FEEDER
Frederick N. Schroen, Portage, Mich., assignor to
Unifab Corporation, Kalamazoo, Mich.
Filed Feb. 19, 1969, Ser. No. 800,678
Int. Cl. A01k 1/00
U.S. Cl. 119—18                        7 Claims

ABSTRACT OF THE DISCLOSURE

A nestable tray for placement over the top of a container for animals, said tray being adapted for holding articles within reach of the animals in the container. The tray has an elongated trough which projects down into the container and the end plates of the trough are inclined to the vertical to permit a nesting of one of said trays within another. A center plate is provided for dividing the trough into two compartments, said plate being pivotable to a position parallel with one of the walls of the trough so as to permit nesting of said trays.

FIELD OF THE INVENTION

This invention relates to a nestable tray for holding articles, and more particularly, relates to a tray having a trough generally V-shaped in cross section therein wherein the end walls of the trough are inclined to the vertical to permit nesting of said trays.

BACKGROUND OF THE INVENTION

The use of animals, such as mice, for the purpose of conducting tests thereon to determine the effect of various test foods and medicines thereon is quite important to the development of new foods and medicines. Generally, and during such a test, the animals are placed in a controlled environment and then fed a predetermined quantity of a particular food to determine their reaction thereto. Thus, it is necessary that containers be provided for holding the animals during the test, which containers are capable of receiving a tray on the top thereof for holding articles, such as food, within the reach of animals contained within the container.

This particular invention relates to the tray which is placed on top of the container for holding the animals. The use of previously known trays for placement onto the opened top of containers have not been entirely satisfactory due to their inability to withstand rough treatment. That is, when the trays are removed from the containers for purposes of cleaning and storing, laboratory technicians are usually engrossed in what they consider as more important functions within the laboratory and do not like to spend the time cleaning the trays and making sure that they are properly stored. As a result, the trays are often abused by being dropped on the floor and tossed around. As a result, the tray construction becomes bent out of shape and, therefore, not readily capable of being nested one within another.

Accordingly, it is an object of this invention to provide a nestable tray which is durable and capable of withstanding much abuse. It is a further object of this invention to provide a nestable tray which may be inexpensively manufactured.

Other objects and purposes of this invention will be apparent to persons acquainted with nestable trays of this general type upon reading the following specification and inspecting the accompanying drawings, in which:

FIG. 1 is a perspective view of a tray embodying the invention supported upon a container for the animals;

FIG. 2 is a side elevational view of the tray;

FIG. 3 is a top view of the tray;

FIG. 4 is a sectional view taken along the line IV—IV of FIG. 2;

FIG. 5 is a sectional view taken along the line V—V of FIG. 2 and showing the nestability of one of said trays within another of said trays;

FIG. 6 is a sectional view taken along the line VI—VI of FIG. 3;

FIG. 7 is a sectional view taken along the line VII—VII of FIG. 6;

FIG. 8 is a sectional view taken along the line VIII—VIII of FIG. 6.

Certain terminology will be used in the following description for convenience in reference only and will not be limiting. The words "up," "down," "right" and "left" will designate directions in the drawings to which reference is made. The words "in" and "out" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the invention are met by providing a nestable tray for holding articles having a pair of planar walls defining an elongated trough, generally V-shaped in cross section, with the ends of the trough lying in horizontally spaced, at least approximately parallel, planes. A second pair of planar walls are usually arranged in coplanar relationship to each other and are secured to and extend generally horizontally away from the upper edges of the V-shaped trough. A pair of elongated members are connected to the respectively opposite longitudinal sides of the second pair of planar walls and extend parallel to the opposite ends of the trough and are spaced horizontally outwardly therefrom, the elongated members and the opposite ends of the trough defining openings therebetween at each end. Closure means are provided at the opposite ends of the trough and are inclined to the vertical for permitting the trough portion of the tray to nest within another of said trays.

DETAILED DESCRIPTION

A nestable tray 10 of the type embodying the invention (illustrated in FIG. 1) is here shown as mounted onto an open-topped, generally rectangular-shaped plastic container 11. The container 11 has a bottom wall 12 (FIG. 4) and four generally vertical sidewalls 13, 14, 15 and 16. Each of the sidewalls has an outwardly curled upper edge 17.

The nestable tray 10 comprises an annular frame member 21 having a shape generally corresponding to the shape of the container 11 and having a size generally corresponding to the uppermost portion of the curled upper edges 17 of the sidewalls 13, 14, 15 and 16. In this particular embodiment, the frame member 21 is generally rectangular in shape and is comprised of large diameter wire rod having a pair of parallel long side members 22 and a pair of parallel short side members 23.

A plurality of parallel wire rods 24 are secured to and extend between the parallel short members 23 of the annular frame 21. Each of the wire rods 24 are bent near their center to define an elongated trough 26. More particularly, each wire rod 24 comprises a generally horizontal first segment 27 and a second segment 28 inclined to the vertical and extending downwardly away from the first segment 27. A third segment 29 is inclined to the vertical and extends upwardly away from the lower end of each of the second segments 28 and a fourth segment 31 extends generally horizontally away from the upper end of each of the inclined third segments 29. In this particular embodiment, the segments 27 and 31 define a pair of coplanar walls. The inclined second and third segments 28 and 29, respectively, define a pair of transverse planar walls which form the elongated trough 26, which trough in this particular embodiment, is generally V-shaped in cross section as illustrated in FIGS. 1 and 2.

In this particular embodiment, the planar walls defined by the first and fourth segments 27 and 31, respectively, are spaced below the plane of the annular frame member 21. A generally L-shaped segment 32 is secured to the ends of each of the wire rods 24 and serve to interconnect the segments 27 and 31 to the parallel short members 23 of the annular frame member 21.

A pair of elongated members 33 and 34 are secured to and extend between the parallel short members 23 of the annular frame member 21. In this particular embodiment, the midsection of the elongated members 33 and 34 are coplanar with the first and fourth segments 27 and 31, respectively, of each of the wire rods 24. Generally L-shaped segments are secured to the ends of each of the elongated members 33 and 34 and serve to interconnect same with the parallel short members 23. In this particular embodiment, each of the elongated members 33 and 34 are wire rods of preferably the same diameter as the wire rods 24.

The wire rods 24 are further strengthened by tie members 37 which are secured to each of the wire rods 24 and extend transversely beneath same and are secured at their ends to the parallel long members 22 of the annular frame member 21. A tie member 38 is secured to each of the segments 29 adjacent the apex 44 of the trough to further rigidify the construction of the wire rods defining the generally V-shaped trough 26.

The segments 28' and 29' of the two wire rods 24' (FIG. 2) positioned adjacent the elongated members 33 and 34 define the boundary of an opening 39 therewith. Closure means 41 are secured to the segments 28' and 29' and the respective elongated members 33 and 34. More particularly, each of the closure means 41 comprises a plate 42 (FIGS. 4 and 5), the upper edge 43 of which is bent outwardly and secured to the respective elongated members 33 and 34. The plate 42 preferably lies in a plane parallel to the plane defined by the respective elongated members 33 and 34 and the apex 44 of the ends of the elongated trough 26 defined by the segments 28' and 29' of the wire rods 24'. Since the wire rods 24' are spaced horizontally inwardly from the elongated members 33 and 34, the plates 42 are inclined to the vertical and extend outwardly from the apex 44.

A flange 46 is secured to the left end (FIG. 3) of each of the plates 42, extends inwardly therefrom and is secured to the segment 29' of the rods 24'. A flange 47 is secured to the right edge (FIG. 3) of the plates 42 and extends inwardly therefrom and is secured to the segments 28' of the wire rods 24'. Thus, the plates 42 and the flanges 46 and 47 serve to close the openings 39. Since the plates 42 are inclined to the vertical at an angle to the plane defined by the segments 28' and 29', the flanges 46 and 47 vary in width from the bottom thereof to the top thereof to accommodate the spacing between the wire rods 24' and the respective ones of the elongated members 33 and 34.

If desired, the elongated trough 26 may be divided into two sections by a plate 48. In this particular embodiment, the plate is pivotally secured to the segment 29 of a wire rod 24 by a pair of hinges 49. The hinges 49 comprise a pair of tabs 50 which project from one edge of the plate 48 and are curled around a segment 29 of a wire rod 24 as illustrated in FIG. 7. The plate 48 is pivotable between an upright position illustrated in FIGS. 6 and 7 parallel to the plane defined by the segments 28 and 29 of the wire rods 24 and a position parallel with the plane defined by the parallel segments 29 of each of the wire rods 24 as illustrated in dotted lines in FIG. 5.

The plate 48 is secured in the upright position by a resilient tab 51 which comprises a segment 52 which projects sidewardly away from the plane of the plate 48 and a segment 53 which extends from the outer end of the segment 52 parallel with the plane of the plate 48. The spacing between the segment 53 and the remainder portion of the plate 48 is slightly less than the diameter of the segment 28 of a wire rod 24. The opening or gap 54 between the segment 53 and the remainder portion of the plate 48 permits the receipt of the segment 28 of the wire rod 24 therebetween thereby securing the plate 48 in an upright position.

The hinges 49 on the plate 48 permit the plate to slide lengthwise along the segment 29 to the dotted line position illustrated in FIG. 8. Thus, the plate 48 can be moved to effect a release from engagement with the resilient tab 51 to permit the plate 48 to pivot to the dotted line position illustrated in FIG. 5.

If desired, a plate 56 (FIG. 4) may be secured, as by welding, to a plurality of segments 28 of a corresponding plurality of wire rods 24. The plate 56 can be provided with an elongated opening 57 therein.

OPERATION

In the laboratory, technicians place animals, such as young mice, into containers 11. The trays 10 are then placed onto the open tops of the containers 11 and serve to hold articles, such as food, thereon within reach of the animals within the containers 11.

The plate 56 having the elongated opening 57 therein serves to permit a nipple secured to a bottle to project through the opening 57. Since the trough 26 projects down into the container 11, the animals will be able to reach the nipple for purposes of obtaining food. The trough 26 can also hold other types of solid food so that the animals can reach between the parallel wire rods 24 to nibble same.

The spacing of the outwardly bent upper edges 43 to the sidewalls 13 and 15 of the container is very close to prevent the animals from climbing out of the container between the plates 42 and the sidewalls 13 and 15. The securement of the upper edges 43 to the respective one of the elongated members 33 and 34 further strengthens the upper edges of the plates to further eliminate the problem.

At the completion of the test, the animals can be removed from the containers and put into cages or the like and the trays 10 can be removed from the testing area, cleaned and stored.

For such storing, after cleaning, the plate 48 will be slid leftwardly (FIGS. 6 and 8) to release the resilient clip or tab 51 from engagement with the segment 28 of a wire rod 24. This will permit the plate to pivot to the dotted line position illustrated in FIG. 7. It is obviously not necessary to move the plate from the upright position in the uppermost one of the nested trays.

The inclined plates 42 of the closure means 41 permit one tray 10 to be nested within another of said trays as illustrated in FIG. 5. The apex 44 and the segments 28 and 29 defining the elongated trough 26 of one tray will fit into the elongated trough of another of said trays.

Although a particular preferred embodiment of the invention has been disclosed above for illustrative purposes, it will be understood that variations or modifications thereof are fully contemplated.

The embodiments of the invention in which an exclusive property or privilege is claimed are defined as follows:

1. A nestable tray for holding articles, comprising:
  a first pair of planar walls positioned transverse to each other to define an elongated trough V-shaped in cross section, the ends of said trough terminating in horizontally spaced, vertical and parallel planes;
  a second pair of planar walls secured to and extending generally horizontally away from the upper edges of said V-shaped trough;
  a pair of elongated members connected to the opposite longitudinal sides of said second pair of planar walls and extending parallel to the opposite ends of said trough and spaced horizontally outwardly therefrom, said elongated members and the edges of said vertical and parallel opposite ends of said trough defining openings therebetween at each end;

closure means covering each of said openings and comprising first plate means inclined to the vertical and secured adjacent the upper edge thereof to each of said elongated members, said first plate means including at least two flanges projecting inwardly therefrom, the free ends of said flanges being secured to end edges of the respective ones of said first pair of planar walls;

whereby the inclined first plate means on the opposite ends of said trough will permit said tray to nest within another of said trays.

2. The nestable tray defined in claim 1, wherein the upper edges of said first plate means are bent and extend outwardly from said V-shaped trough, said bent upper edges being secured to the respective ones of said pair of elongated members.

3. The nestable tray defined in claim 1, wherein said first and second pairs of planar walls are made of a wire construction comprising a plurality of wire rods extending parallel to said ends of said trough the full longitudinal length of said tray, said rods being bent in a manner to define said V-shaped trough; and including second plate means releasably and pivotably secured to at least one of said parallel wire rods defining said first pair of planar walls, said second plate means being pivotable between a first upright position parallel with the ends of trough and a second position parallel with one of said first pair of parallel walls whereby, when said second plate means is in said second position, said tray will receive another of said trays.

4. The nestable tray defined in claim 3, wherein said second plate means is slideably and pivotably secured to said wire rod defining one of said first pair of planar walls, said second plate means being adapted to be slideable between a third position close to said wire rod defining the other of said first pair of planar walls and a fourth position spaced therefrom, said second plate means being further adapted to be releasably secured, when in said first and third positions, to said wire rod defining the other of said first pair of planar walls, said second plate means becoming released from said wire rod when moved to said fourth position to permit said second plate means to pivot to said second position for nesting purposes.

5. The nestable tray defined in claim 1, including an annular frame member encircling said first and second pairs of planar walls, the edges of said second pair of planar walls being secured to said annular frame to rigidify said edges.

6. A nestable tray for holding articles, comprising:

a first pair of planar walls positioned transverse to each other to define an elongated trough V-shaped in cross section, the ends of said trough lying in horizontally spaced parallel planes;

a second pair of planar walls secured to and extending generally horizontally away from the upper edges of said V-shaped trough;

closure means secured across the ends of said trough and comprising plates inclined to the vertical, said plates having at least two triangularly shaped flanges projecting inwardly therefrom and occupying the spacing between said plates and said ends of said trough, the free ends of said flanges being secured to the ends of the respective ones of said first pair of planar walls;

whereby the inclined plates on the opposite ends of said trough will permit said tray to nest within another of said trays.

7. The nestable tray defined in claim 6, wherein the upper edges of said plates are flanged outwardly to rigidify the upper edges of said plates.

References Cited
UNITED STATES PATENTS

| | | | |
|---|---|---|---|
| 3,256,859 | 6/1966 | Petit, Jr. | 119—18 |
| 3,358,649 | 12/1967 | Gabriel et al. | 119—18 |
| 3,381,665 | 5/1968 | Naturale | 119—18 |

HUGH R. CHAMBLEE, Primary Examiner